US012456825B2

(12) United States Patent
Li et al.

(10) Patent No.: US 12,456,825 B2
(45) Date of Patent: Oct. 28, 2025

(54) ANTENNA VIBRATOR AND ANTENNA

(71) Applicant: Suzhou Luxshare Technology Co., Ltd., Suzhou (CN)

(72) Inventors: Zhenhua Li, Suzhou (CN); Chengyu Xu, Suzhou (CN); Wenkai Xu, Suzhou (CN); Gang Zhou, Suzhou (CN)

(73) Assignee: Suzhou Luxshare Technology Co., Ltd., Suzhou (CN)

( * ) Notice: Subject to any disclaimer, the term of this patent is extended or adjusted under 35 U.S.C. 154(b) by 74 days.

(21) Appl. No.: 18/199,041

(22) Filed: May 18, 2023

(65) Prior Publication Data

US 2024/0113446 A1 Apr. 4, 2024

(30) Foreign Application Priority Data

Sep. 30, 2022 (CN) ........................ 202211213692.9

(51) Int. Cl.

*H01Q 21/24* (2006.01)
*H01Q 1/38* (2006.01)
*H01Q 1/50* (2006.01)
*H01Q 19/10* (2006.01)

(52) U.S. Cl.

CPC ............... *H01Q 21/24* (2013.01); *H01Q 1/38* (2013.01); *H01Q 1/50* (2013.01); *H01Q 19/10* (2013.01)

(58) Field of Classification Search

CPC ............ H01Q 21/24; H01Q 1/38; H01Q 1/50; H01Q 19/10; H01Q 1/42; H01Q 9/045; H01Q 9/0478; H01Q 9/0442; H01Q 1/246; H01Q 1/36; H01Q 1/52; H01Q 13/10

See application file for complete search history.

(56) References Cited

U.S. PATENT DOCUMENTS

| | | | | |
|---|---|---|---|---|
| 7,079,079 | B2 | 7/2006 | Jo et al. | |
| 7,688,271 | B2 * | 3/2010 | Cao | H01Q 9/28 343/810 |
| 2004/0217910 | A1 * | 11/2004 | Montgomery | H01Q 1/36 343/770 |
| 2022/0029279 | A1 | 1/2022 | Jiang et al. | |

FOREIGN PATENT DOCUMENTS

| | | | |
|---|---|---|---|
| CN | 201994412 | U | 9/2011 |
| CN | 110247172 | A | 9/2019 |
| CN | 111541010 | A | 8/2020 |
| CN | 211670319 | U | 10/2020 |
| CN | 211829186 | U | 10/2020 |
| CN | 212412193 | U | 1/2021 |

(Continued)

*Primary Examiner* — Seung H Lee

(74) *Attorney, Agent, or Firm* — Birch, Stewart, Kolasch & Birch, LLP

(57) ABSTRACT

The embodiments of the present disclosure provide an antenna vibrator and an antenna, and the antenna vibrator includes a radiation board. A center region of the radiation board is provided with a plurality of slits, and the radiation board is bent downwards at a peripheral region of each slit to form a support portion and a hollowed-out hole. The support portion serves to support and connect. At the same time, by forming the slit on the radiation board, the isolation of the vibrator is optimized, and the cross polarization ratio after the vibrator being arrayed may meet conventional index without adding a boundary condition.

18 Claims, 8 Drawing Sheets

(56) References Cited

FOREIGN PATENT DOCUMENTS

| | | | | | |
|---|---|---|---|---|---|
| CN | 212626051 | U | | 2/2021 | |
| CN | 112467343 | A | | 3/2021 | |
| CN | 214254715 | U | | 9/2021 | |
| CN | 114069212 | A | | 2/2022 | |
| CN | 114361804 | A | | 4/2022 | |
| CN | 216288941 | U | | 4/2022 | |
| CN | 107579351 | B | | 4/2023 | |
| CN | 218788504 | U | | 4/2023 | |
| CN | 218827854 | U | | 4/2023 | |
| TW | 200701559 | A | | 1/2007 | |
| TW | M420057 | U1 | | 1/2012 | |
| WO | WO-2021046665 | A1 | * | 3/2021 | ........... H01Q 1/1207 |
| WO | WO 2021/226837 | A1 | | 11/2021 | |

* cited by examiner

ANTENNA VIBRATOR AND ANTENNA

CLAIM OF PRIORITY AND CROSS-REFERENCE TO RELATED APPLICATION(S)

This application claims the benefit of Chinese Patent Application No. 202211213692.9, filed on Sep. 30, 2022, which is incorporated herein by reference in its entirety.

BACKGROUND OF THE DISCLOSURE

1. Field of the Disclosure

The present disclosure relates to the technical field of communications, and in particular to an antenna vibrator and an antenna.

2. Description of the Related Art

A sheet metal stamping vibrator is a common vibrator used in 5G Massive Multiple Input Multiple Output (MIMO) base station antenna. In an array composed of the vibrators, optimization of a cross polarization ratio may be implemented by adding a boundary condition (such as a sheet metal) to a sub-array, and light-weight requirement of the base station antenna structure may not be met.

BRIEF DESCRIPTION OF THE DISCLOSURE

In view of this, a purpose of the present disclosure is to provide an antenna vibrator and an antenna to implement that a cross polarization ratio of the constituent array meets a conventional index without adding a boundary condition.

In a first aspect, an embodiment of the present disclosure provides an antenna vibrator, including: a radiation board, where a center region of the radiation board is provided with a plurality of slits, and the radiation board is bent downwards at a peripheral region of each slit to form a support portion and a hollowed-out hole.

Further, the total length of the slit is greater than or equal to 0.05 center frequency wavelengths and less than or equal to 0.25 center frequency wavelengths.

Further, the slit includes a main part; and the length of the main part is greater than or equal to 0.04 center frequency wavelengths and less than or equal to 0.06 center frequency wavelengths.

Further, the slit further includes two extension parts respectively extending outwards from two ends of the main part; and the length of each extension part is less than or equal to 0.1 center frequency wavelengths.

Further, the radiation board is square, and a side length of the radiation board is greater than or equal to 0.32 center frequency wavelengths and less than or equal to 0.42 center frequency wavelengths; and the four hollowed-out holes are uniformly distributed at a diagonal of the radiation board.

Further, the support portion is bent downwards along the inner edge of the hollowed-out hole.

Further, a lower end of the support portion is bent to form a connecting portion.

Further, the height of the support portion is greater than or equal to 0.06 center frequency wavelengths and less than or equal to 0.12 center frequency wavelengths.

Further, the hollowed-out hole is rectangular, and the width of the hollowed-out hole is greater than or equal to 0.025 center frequency wavelengths and less than or equal to 0.045 center frequency wavelengths.

In a second aspect, an embodiment of the present disclosure further provides an antenna, including: a feed member; the antenna vibrator according to the first aspect, the antenna vibrator being electrically connected to the feed member through the support portion; and an antenna cover covering the antenna vibrator.

The embodiments of the present disclosure provide an antenna vibrator and an antenna, and the antenna vibrator includes a radiation board. A center region of the radiation board is provided with a plurality of slits, and the radiation board is bent downwards at a peripheral region of each slit to form a support portion and a hollowed-out hole. The support portion serves to support and connect. At the same time, by forming the slit on the radiation board, the isolation of the vibrator is optimized, and the cross polarization ratio after the vibrator being arrayed may meet conventional index without adding a boundary condition.

BRIEF DESCRIPTION OF THE DRAWINGS

The foregoing and other objects, features and advantages of the present disclosure will become more apparent from the following description of embodiments of the present disclosure with reference to the accompanying drawings, in which.

DETAILED DESCRIPTION OF EMBODIMENTS OF THE DISCLOSURE

The present disclosure is described below based on the embodiments, but the present disclosure is not limited thereto. In the following detailed description of the present disclosure, certain specific details are described in detail. The present disclosure may be fully understood by those skilled in the art without the description of these detailed parts. In order to avoid confusing the substance of the present disclosure, well-known methods, processes, flows, elements and circuits have not been described in detail.

In addition, it should be understood by those of ordinary skill in the art that the drawings provided herein are for illustrative purposes, and the drawings are not necessarily drawn to scale.

Unless expressly required in the context, the terms "include", "comprise", and other similar words should be construed as inclusive rather than exclusive or exhaustive, that is, the meaning of "including, but not limited to".

In the description of the present disclosure, it should be understood that the terms "first", "second", etc. are merely used for descriptive purposes, but may not be understand as indicating or implying relative importance. In addition, in the description of the disclosure, unless otherwise stated, "plurality" means two or more.

Figure 1:
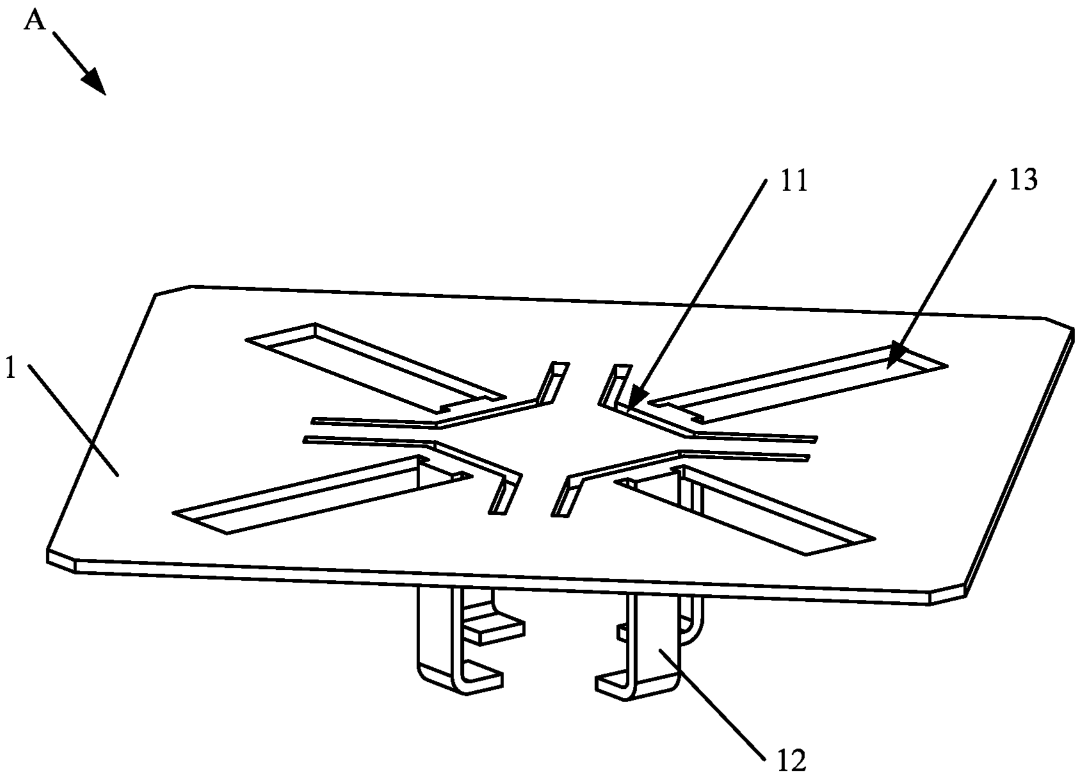
FIG. 1 is a schematic structural diagram of an antenna vibrator provided by a first embodiment of the present application.
Figure 2:
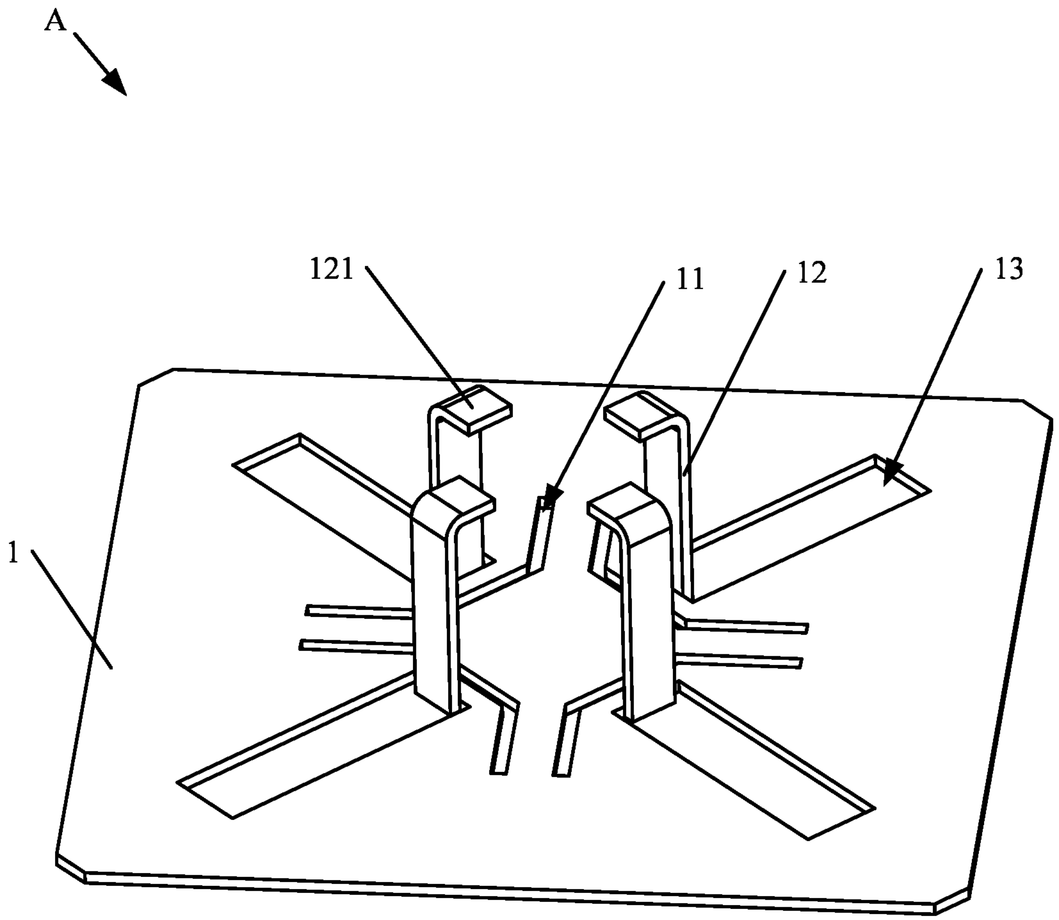
FIG. 2 is a schematic structural diagram of another view of an antenna vibrator provided by a first embodiment of the present application.

FIG. 1 is a schematic structural diagram of an antenna vibrator A provided by a first embodiment of the present application, and FIG. 2 is a schematic structural diagram of another view of an antenna vibrator A provided by a first embodiment of the present application. As shown in FIGS. 1 and 2, the antenna vibrator A includes a radiation board 1 used to transmit or receive a communication signal. Further, a center region of the radiation board 1 is provided with a plurality of slits 11, and the radiation board 1 is bent downwards at a peripheral region of each slit 11 to form a support portion 12 and a hollowed-out hole 13. The support portion 12 supports and feeds the radiation board 1. It should be noted that the antenna vibrator A in this embodiment is formed by stamping a sheet metal part (such as an aluminum or a copper sheet). In other words, after being stamped, the sheet metal part forms the radiation board 1 with a flat plate structure and the support portion 12 bending downwards, and the hollowed-out hole 13 is a through hole corresponding to the support portion 12 on the radiation board 1.

It should be noted that the slit 11 may be preset on the sheet metal part, or may be formed through synchronous processing during stamping. Thus, the antenna vibrator A may be integrally formed by one stamping, the processing is simple and efficient, and the material cost is greatly reduced.

It should be further noted that, the antenna vibrator A in the embodiment implements the optimization of the isolation of the antenna vibrator A by improving the radiation board 1, that is, by providing a slit 11 on the radiation board 1, and the cross polarization ratio of the antenna vibrator A after being arrayed may be enabled to meet a conventional index without adding a boundary condition. In another aspect, the slit 11 is arranged on the radiation board 1, which helps to reduce the weight of the antenna vibrator A, so as to implement lightweight of the antenna vibrator A and the antenna.

Figure 3:
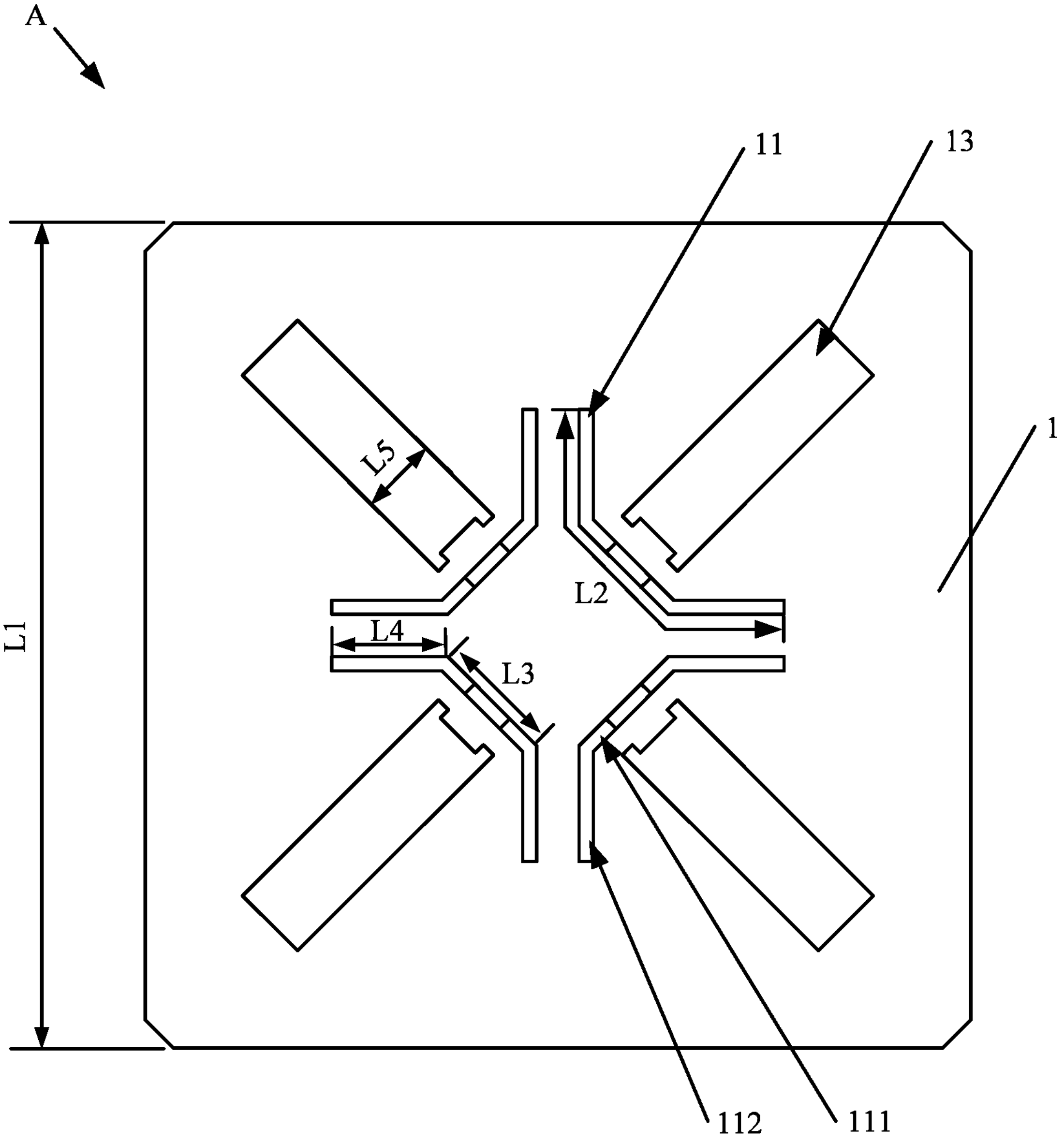
FIG. 3 is a schematic diagram of a top view size of an antenna vibrator provided by a first embodiment of the present application.

As shown in FIG. 3, in this embodiment, a total length L2 of each slit 11 is greater than or equal to 0.05 center frequency wavelengths and less than or equal to 0.25 center frequency wavelengths, and the width of slit 11 may be set as required. It should be noted that the antenna has a certain operating frequency range, and in this range, the antenna has the minimum impedance and the highest efficiency. The middle optimum point of the operating frequency range is center operating frequency, and the center frequency wavelength refers to the wavelength of the center operating frequency. In an implementation, the total length L2 of the each slit 11 is 0.15 center frequency wavelengths.

Further, as shown in FIG. 3, the slit 11 includes a main part 111. Specifically, each hollowed-out hole 13 corresponds to a slit 11, and the hollowed-out hole 13 is located in the peripheral region of the main part 111. In this embodiment, the length L3 of the main part 111 is greater than or equal to 0.04 center frequency wavelengths and less than or equal to 0.06 center frequency wavelengths, and the width of the main part 111 may be set as required. In an implementation, the length L3 of the main part 111 is set to be 0.05 center frequency wavelengths.

Furthermore, as shown in FIG. 3, the slit 11 further includes two extension parts 112 respectively extending outwards from two ends of the main part 111. In other words, the two extension parts 112 are respectively located at two sides of the main part 111, the slit 11 is formed into a U shape through a main part 111 and two extension parts 112, and the hollowed-out hole 13 is at least partially located in a region encircled by the slit 11. In this embodiment, the length L4 of each extension part 112 is less than or equal to 0.1 center frequency wavelengths. In an implementation, the length L4 of each extension part 112 is set to be 0.05 center frequency wavelengths.

As shown in FIG. 3, in this embodiment, the radiation board 1 is square. In other words, the antenna vibrator A is formed by stamping a square sheet metal part. Further, a side length L1 of the radiation board 1 is greater than or equal to 0.32 center frequency wavelengths and less than or equal to 0.42 center frequency wavelengths. In an implementation, the side length L1 of the radiation board 1 is set to be 0.37 center frequency wavelengths, that is, the antenna vibrator A is formed by stamping a sheet metal with the side length L1 being 0.37 center frequency wavelengths, and the operating frequency relative bandwidth of the antenna vibrator A is 14.3%. Further, there are four hollowed-out holes 13, which are all formed as rectangular through holes. The four hollowed-out holes 13 are uniformly distributed at a diagonal of the radiation board 1, and form a centrally symmetrical cross shape.

Correspondingly, as shown in FIGS. 1 to 3, there are four slits 11, which are also located at the diagonal of the radiation board 1. It should be noted that the main part 111 of the slit 11 is perpendicular to the corresponding diagonal, and the extension part 112 is perpendicular to the adjacent side of the radiation board 1. In other words, an angle between the main part 111 and the extension part 112 of the slit 11 is 135°. It may be easily understood that an angle between the main part 111 and the extension part 112 of the slit 11 may also be set as required, such as 90° or 120°.

As an optional implementation, the radiation board 1 may also be set to be other shapes of uniform symmetry, such as regular polygon or circular shape, so as to ensure stability of an antenna phase center. In another aspect, the antenna vibrator A is formed by stamping a sheet thin sheet metal 1, that is, the radiation board 1 is a thin sheet metal, so that the design requirements of lightweight antenna are met.

As shown in FIGS. 1 and 2, in this embodiment, the support portion 12 is bent downwards along the inner edge of the hollowed-out hole 13. In other words, the support portion 12 is located on an inward side. In an implementation, a bending angle of the support portion 12 is 90°, that is, the support portion 12 is perpendicular to the radiation board 1. Thus, after the antenna vibrator A is connected to a feed member B through the support portion 12, the radiation board 1 is kept parallel to an antenna cover C, so that propagation effect of electromagnetic wave is ensured.

Figure 4:
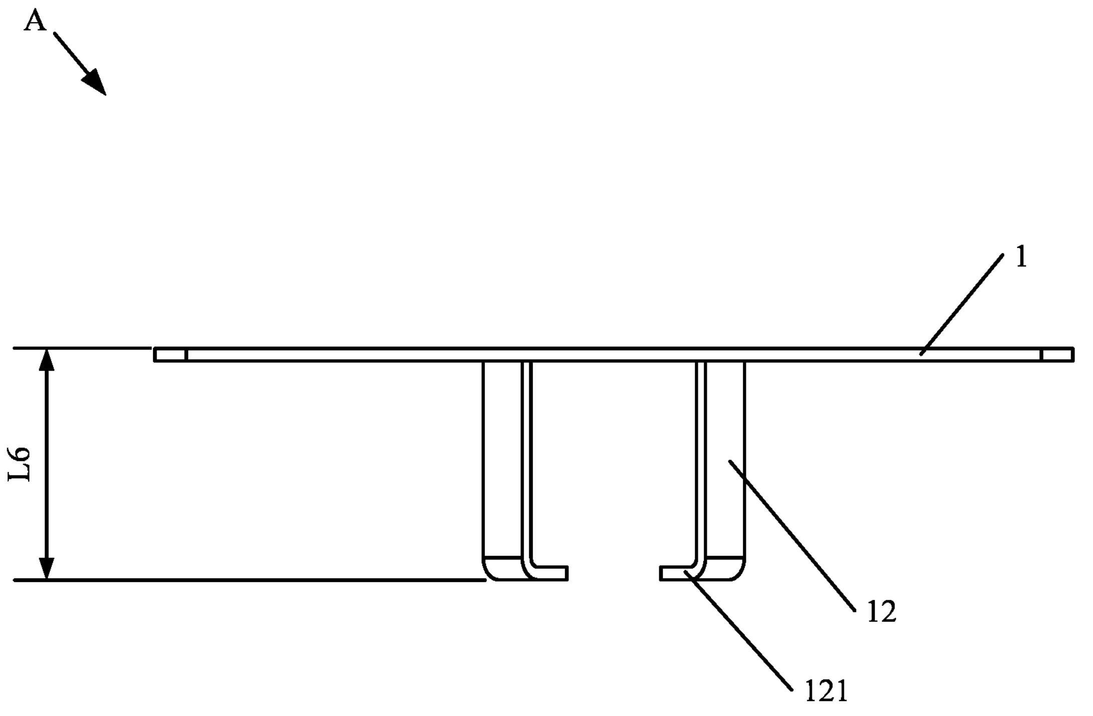
FIG. 4 is a schematic diagram of a front view size of an antenna vibrator provided by a first embodiment of the present application.

As shown in FIGS. 2 and 4, in this embodiment, the lower end of the support portion 12 is bent inwards to form a connecting portion 121, and the antenna vibrator A is electrically connected to the feed member B through the connecting portion 121. In an implementation, a bending angle of the connecting portion 121 is 90°, that is, the connecting portion 121 is perpendicular to the support portion 12 and parallel to the radiation board 1. Thus, after the antenna vibrator A is electrically connected through the connecting portion 121, the radiation board 1 is kept parallel to an antenna cover C, so that propagation effect of electromagnetic wave is ensured.

It should be noted that there are four support portions 12, and the number of connecting portion 121 corresponds to four. Thus, the antenna vibrator A is connected to four feed points on the feed member B through four connecting portions 121, that is, a four-point feeding manner is used to ensure stability of an antenna phase center.

As shown in FIG. 4, in this embodiment, the height L6 of the support portion 12 is greater than or equal to 0.06 center frequency wavelengths and less than or equal to 0.12 center frequency wavelengths. In an implementation, the height L6 of the support portion 12 is 0.09 center frequency wavelengths.

As shown in FIGS. 1 to 3, in this embodiment, the hollowed-out hole 13 is rectangular, and the width is parallel to adjacent sides of the radiation board 1. Further, as shown in FIG. 3, the width L5 of the hollowed-out hole 13 is greater than or equal to 0.025 center frequency wavelengths and less than or equal to 0.045 center frequency wavelengths. In an implementation, the width L5 of the hollowed-out hole 13 is 0.035 center frequency wavelengths. It may be easily understood that the hollowed-out hole 13 may also be set to other shapes, and the shape of support portion 12 corresponds to the hollowed-out hole 13. In another aspect, in this embodiment, the width of the rectangular hollowed-out hole 13 is parallel to the main part 111 of the slit 11.

In the first embodiment of the present application, an improved design of the radiation surface of an antenna vibrator A is implemented by providing a slit 11 on a radiation board 1 of the antenna vibrator A, thereby achieving the optimization of the isolation of the antenna vibrator A and the cross polarization ratio of the antenna vibrator A after being arrayed, so that the cross polarization ratio of the array meets a conventional index without adding a boundary condition.

Figure 5:
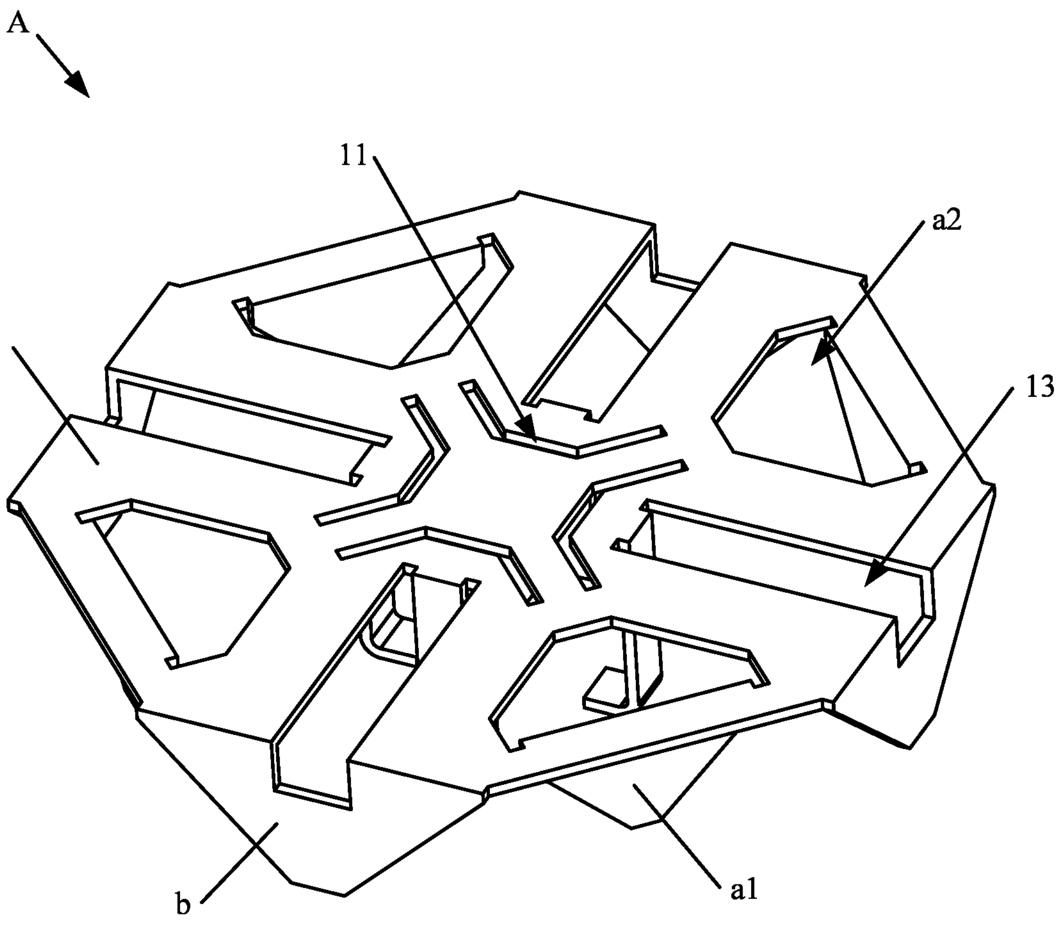
FIG. 5 is a schematic structural diagram of an antenna vibrator provided by a second embodiment of the present application.
Figure 6:
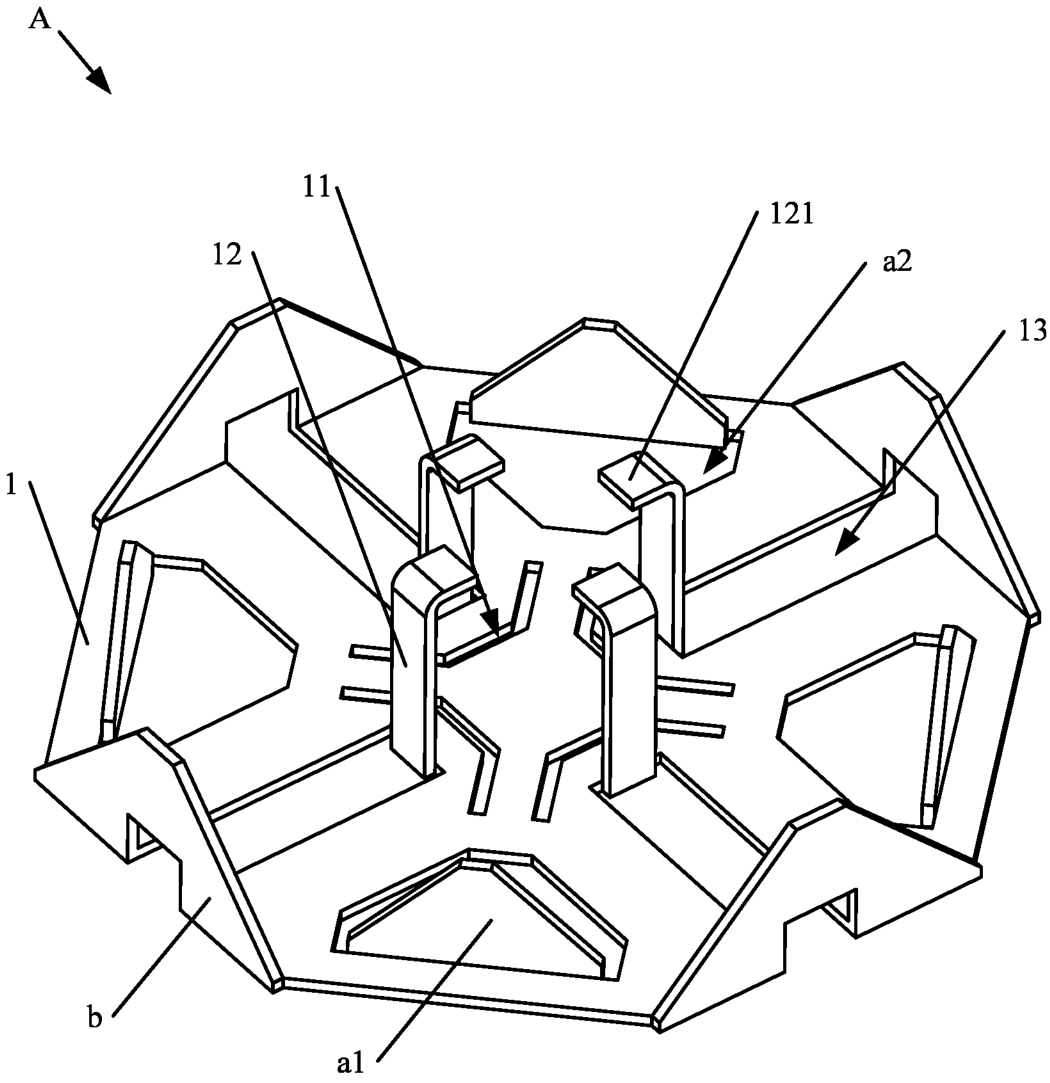
FIG. 6 is a schematic structural diagram of another view of an antenna vibrator provided by a second embodiment of the present application.

As shown in FIGS. 5 and 6, the second embodiment of the present application further provides an antenna vibrator A. Part of structure of the antenna vibrator A is described as above, and details are not described herein again. It should be noted that the antenna vibrator A further includes a plurality of bending portion a1 and/or a plurality of bending angle portions b, that is, the antenna vibrator A may include both the slit 11 and bending portion a1, may include both the slit 11 and the bending angle portion b, and may include the slit 11, the bending portion a1, and the bending angle portion b simultaneously. Thus, the isolation of the antenna vibrator A and the cross polarization ratio of the array may be further optimized by providing the bending portion a1 and/or the bending angle portion b on the basis of the slit 11.

Specifically, in an implementation, the antenna vibrator A includes both the slit 11 and the bending portion a1, where the radiation board 1 is bent downwards in a region between two adjacent hollowed-out holes 13 to form a plurality of bending portions a1 and a plurality of additional hollowed-out holes a2. More specifically, corresponding to the four rectangular hollowed-out holes 13, the four additional hollowed-out holes a2 are in an isosceles trapezoidal shape, upper line with a shorter length is close to the center of the radiation board 1, lower line with a longer length is close to the edge of the radiation board 1, and the upper line and the lower line are parallel to adjacent sides of the radiation board 1. In another aspect, two waists of the additional hollowed-out hole a2 are respectively parallel to an adjacent diagonal, that is, the two waists are perpendicular to each other. It should be noted that the lower line length of the additional hollowed-out hole a2 is greater than or equal to 0.07 center frequency wavelengths and less than or equal to 0.13 center frequency wavelengths, and the height of the additional hollowed-out hole a2 is greater than or equal to 0.05 center frequency wavelengths and less than or equal to 0.09 center frequency wavelengths. It may be easily understood that the additional hollowed-out hole a2 may also be set to other shapes, and the shape of bending portion a1 corresponds to the additional hollowed-out hole a2. Thus, the antenna vibrator A is additionally provided with the bending portion a1, so that the isolation of the antenna vibrator A and the cross polarization ratio of the array are further optimized.

In another implementation, the antenna vibrator A includes both the slit 11 and the bending angle portion b. It should be noted that, the antenna vibrator A is formed by stamping a square sheet metal part, and the bending angle portion b is formed by stamping four corners of the square. Further, bending direction and bending angle of the bending angle portion b are the same as those of the support portion 12. In another aspect, the diagonal of the radiation board 1 is perpendicular to the plane of the corresponding bending angle portion b. In this embodiment, the height of the bending angle portion b is greater than or equal to 0.045 center frequency wavelengths and less than or equal to 0.105 center frequency wavelengths. Thus, the antenna vibrator A is additionally provided with the bending angle portion b, so that the isolation of the antenna vibrator A and the cross polarization ratio of the array are further optimized.

In another implementation, the antenna vibrator A includes both the slit 11, the bending portion a1, and the bending angle portion b. Structure features of the bending portion a1 and the bending angle portion b are described as above, and details are not described herein again. It may be easily understood that the antenna vibrator A is additionally provided with the bending portion a1 and the bending angle portion b simultaneously, so that the isolation of the antenna vibrator A and the cross polarization ratio of the array are further optimized.

In the second embodiment of the present application, an improved design of the radiation surface of an antenna vibrator A is implemented by additionally providing a bending portion a1 and/or a bending angle portion b based on an existing slit 11, thereby further optimizing isolation of the antenna vibrator A and the cross polarization ratio of the antenna vibrator A after being arrayed, so that the cross polarization ratio of the array meets a conventional index without adding a boundary condition.

Figure 7:
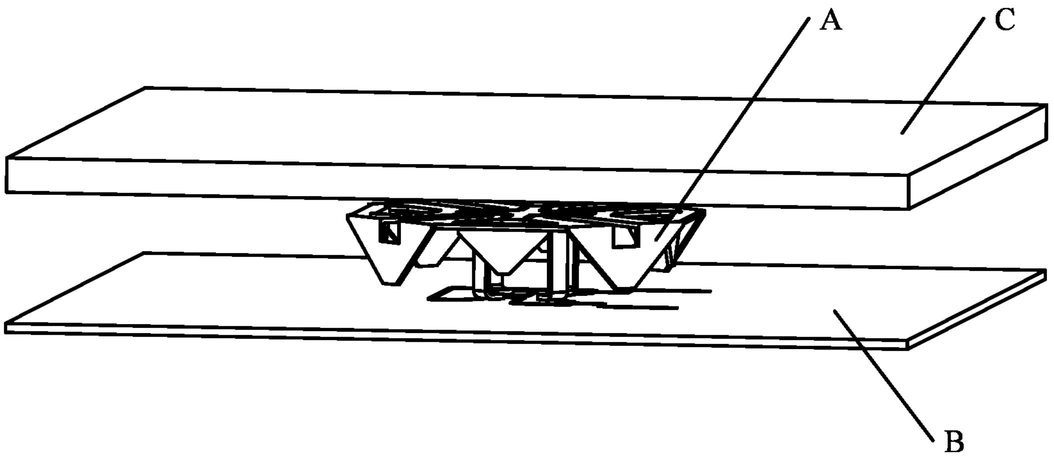
FIG. 7 is a schematic structural diagram of an antenna provided by a third embodiment of the present application.
Figure 8:
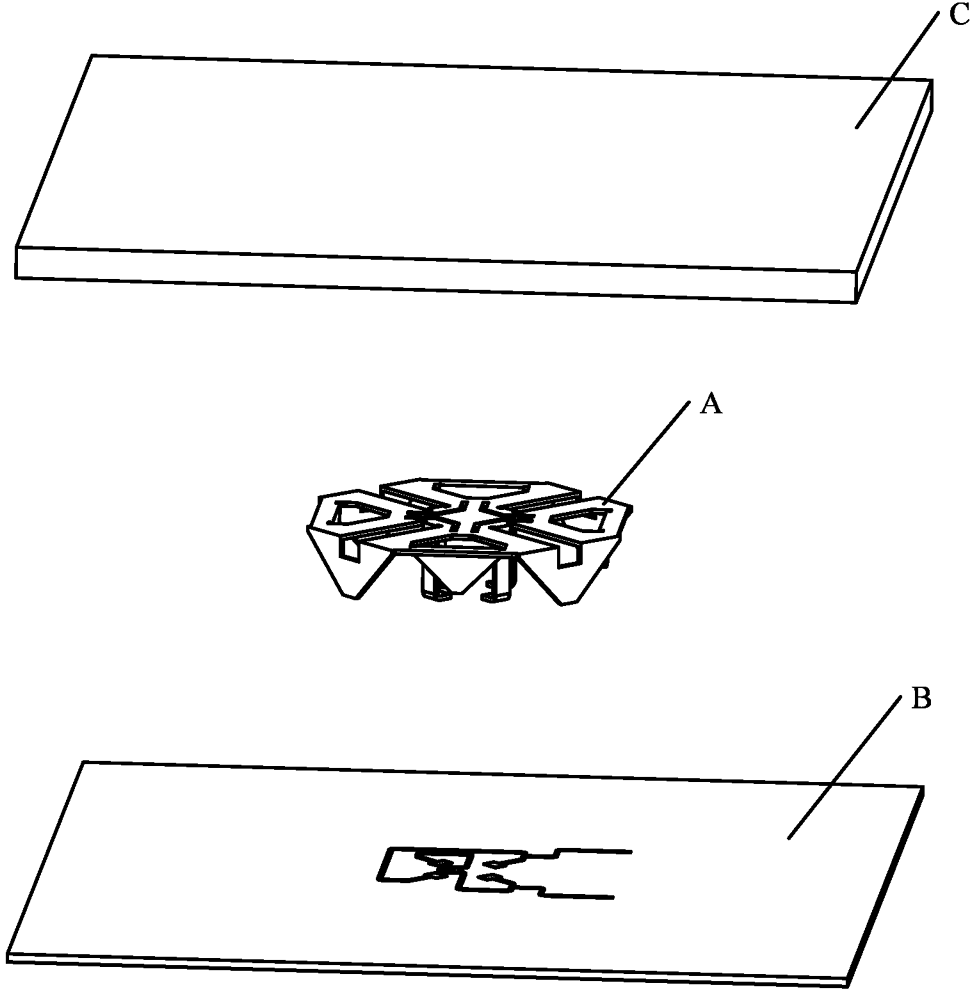
FIG. 8 is an explosion schematic diagram of an antenna provided by a third embodiment of the present application.

As shown in FIGS. 7 and 8, a third embodiment of the present application provides an antenna, including an antenna vibrator A, a feed member B, an antenna cover C, and a reflection board. A structure of the antenna vibrator A is described as above, and details are not described herein again. The antenna vibrator A is electrically connected to the feed member B through the connecting portion 121 on the support portion 12, and the antenna cover C covers the antenna vibrator A.

Specifically, the feed member B includes a circuit board, and one side of the circuit board facing the antenna vibrator A is provided with a feed circuit. A connecting portion of the antenna vibrator A is connected to a feed point of the feed circuit by means of fully automatic reflow soldering (surface-mount soldering) or other manners, so that assembly manpower and assembly time may be saved. The antenna cover C is made of materials such as polyvinyl chloride or fiber glass-reinforced plastics, so as to play a role of packaging protection.

In the third embodiment of the present application, an improved design of the radiation surface of an antenna vibrator A is implemented by providing the slit 11 on the antenna vibrator A, or additionally providing a bending portion a1 and/or the bending angle portion b based on an existing slit 11, thereby achieving the optimization of the isolation of the antenna vibrator A and the cross polarization ratio of the antenna vibrator A after being arrayed, so that the cross polarization ratio of the array meets a conventional index without adding a boundary condition.

The embodiments of the present disclosure provide an antenna vibrator and an antenna, and the antenna vibrator includes a radiation board. A center region of the radiation board is provided with a plurality of slits, and the radiation board is bent downwards at a peripheral region of each slit to form a support portion and a hollowed-out hole. The support portion serves to support and connect. At the same time, by forming the slit on the radiation board, the isolation of the vibrator is optimized, and the cross polarization ratio after the vibrator being arrayed may meet conventional index without adding a boundary condition.

The above description is only the preferred embodiment of the present disclosure and is not intended to limit the present disclosure, and various modifications and changes may be made in the present disclosure for those skilled in the art. Any modification, equivalent replacement, or improvement made within the spirit and principle of the present disclosure should be inclusive in the protection scope of the present disclosure.

We claim:

1. An antenna vibrator, wherein the antenna vibrator (A) comprises:

a radiation board (1), wherein a center region of the radiation board (1) is provided with a plurality of slits (11), the slits (11) are formed entirely within the boundaries of the radiation board (1) and do not extend to the edge of the radiation board (1), and the radiation board (1) is bent downwards at a peripheral region of each of the slits (11) to form a support portion (12) and a hollowed-out hole (13);

wherein the slit (11) comprises:

a main part (111); and two extension parts (112), respectively extending outwards from two ends of the main part (111) to made the slit (11) formed into a U shape, and the hollowed-out hole (13) is at least partially located in a region encircled by the slit (11).

2. The antenna vibrator according to claim 1, wherein the total length of each of the slits (11) is greater than or equal to 0.05 center frequency wavelengths and less than or equal to 0.25 center frequency wavelengths.

3. The antenna vibrator according to claim 1, wherein the length of the main part (111) is greater than or equal to 0.04 center frequency wavelengths and less than or equal to 0.06 center frequency wavelengths.

4. The antenna vibrator according to claim 1, wherein the length of each of the extension part (112) is less than or equal to 0.1 center frequency wavelengths.

5. The antenna vibrator according to claim 1, wherein the radiation board (1) is square, and a side length of the radiation board (1) is greater than or equal to 0.32 center frequency wavelengths and less than or equal to 0.42 center frequency wavelengths; and the four hollowed-out holes (13) are uniformly distributed at a diagonal of the radiation board (1).

6. The antenna vibrator according to claim 1, wherein the support portion (12) is bent downwards along the inner edge of the hollowed-out hole (13).

7. The antenna vibrator according to claim 1, wherein a lower end of the support portion (12) is bent to form a connecting portion (121).

8. The antenna vibrator according to claim 1, wherein the height of the support portion (12) is greater than or equal to 0.06 center frequency wavelengths and less than or equal to 0.12 center frequency wavelengths.

9. The antenna vibrator according to claim 1, wherein the hollowed-out hole (13) is rectangular, and the width of the hollowed-out hole (13) is greater than or equal to 0.025 center frequency wavelengths and less than or equal to 0.045 center frequency wavelengths.

10. The antenna vibrator according to claim 1, wherein the slits (11) are located at a diagonal of the radiation board (1), the main part (111) is perpendicular to the corresponding diagonal.

11. The antenna vibrator according to claim 1, wherein the extension part (112) is perpendicular to the adjacent side of the radiation board (1).

12. The antenna vibrator according to claim 1, wherein a width of the rectangular hollowed-out hole (13) is parallel to the main part (111).

13. The antenna vibrator according to claim 1, wherein parts of the radiation board (1) are bent downwards in a region between two adjacent hollowed-out holes (13) to form a plurality of bending portions (a1) and a plurality of additional hollowed-out holes (a2), and the shape of bending portion (a1) corresponds to the additional hollowed-out hole (a2).

14. The antenna vibrator according to claim 1, further comprises:

a plurality of bending angle portions (b), formed by stamping four corners of a square sheet metal part, wherein the antenna vibrator (A) being formed by stamping the square sheet metal part, a bending direction and a bending angle of the bending angle portion (b) are the same as those of the support portion (12).

15. An antenna, comprising:

a feed member (B);

the antenna vibrator (A) according to claim 1, wherein the antenna vibrator (A) is electrically connected to the feed member (B) through the support portion (12); and an antenna cover (C) covering the antenna vibrator (A).

16. The antenna according to claim 12, wherein the length of each of the extension part (112) is less than or equal to 0.1 center frequency wavelengths.

17. The antenna according to claim 15, wherein the extension part (112) is perpendicular to the adjacent side of the radiation board (1).

18. The antenna according to claim 15, wherein parts of the radiation board (1) are bent downwards in a region between two adjacent hollowed-out holes (13) to form a plurality of bending portions (a1) and a plurality of additional hollowed-out holes (a2), and the shape of bending portion (a1) corresponds to the additional hollowed-out hole (a2).

* * * * *